United States Patent [19]

Frank

[11] 3,833,051
[45] Sept. 3, 1974

[54] HEAT EXCHANGE

[75] Inventor: Charles Roger Frank, Stockton-on-Tees, England

[73] Assignee: Imperial Chemical Industries Limited, London, England

[22] Filed: May 22, 1972

[21] Appl. No.: 255,671

[30] Foreign Application Priority Data
June 23, 1971  Great Britain.................. 29393/71

[52] U.S. Cl....................... 165/1, 165/104, 23/288
[51] Int. Cl............................................ F28d 13/00
[58] Field of Search........ 165/1, 176, 104; 23/288 L

[56] References Cited
UNITED STATES PATENTS

| | | |
|---|---|---|
| 2,281,527 | 4/1942 | Simpson et al.................. 23/288 L |
| 2,620,262 | 12/1952 | Hujsar et al...................... 23/288 L |
| 2,759,710 | 8/1956 | Paille ................................. 165/104 |
| 2,973,944 | 3/1941 | Etter................................... 165/176 |
| 3,601,186 | 8/1971 | Smith................................. 165/176 |

Primary Examiner—Charles Sukalo
Attorney, Agent, or Firm—Cushman, Darby & Cushman

[57] ABSTRACT

An arrangement of heat-transfer conduits for a fluidisation vessel comprising a bundle of "hair pin" U-tubes upstanding from interdigitating supply and discharge heaters for the tube bundle.

3 Claims, 2 Drawing Figures

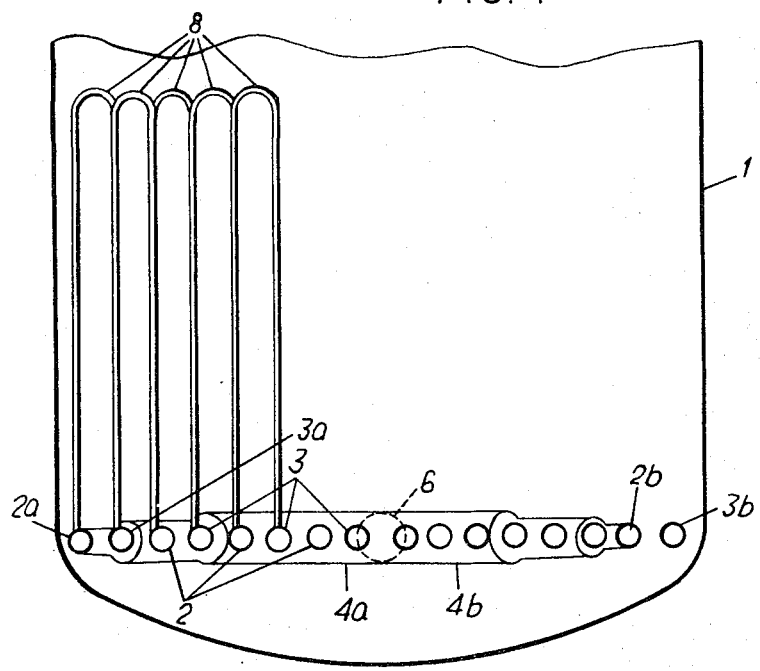
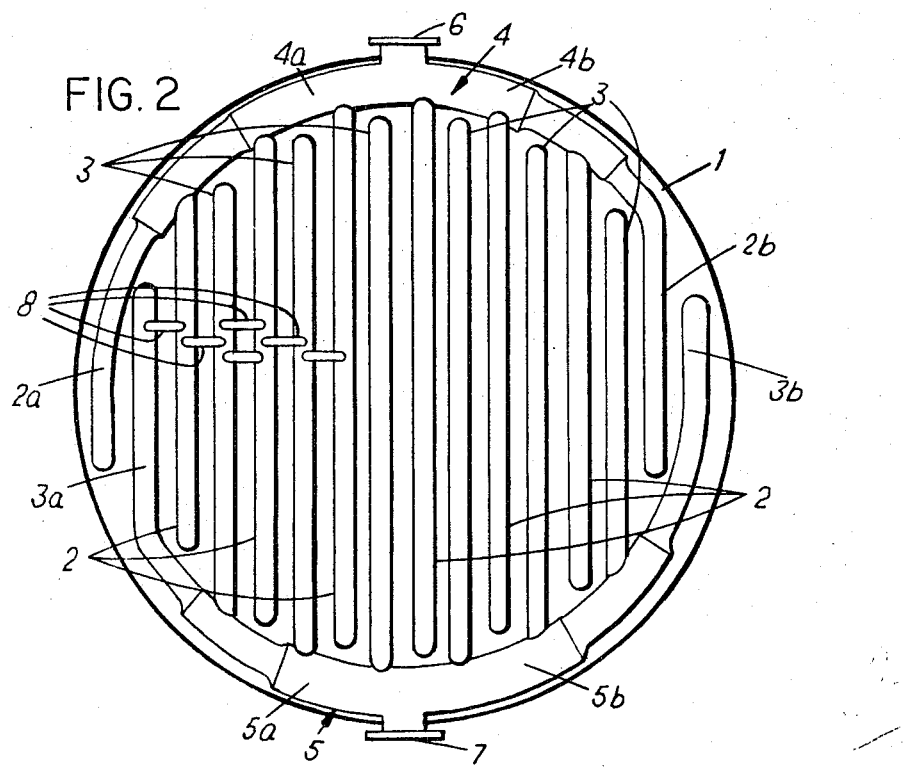

HEAT EXCHANGE

This invention relates to fluidised bed operations, that is to say, to operations in which a bed of particulate solid material is brought into a state of vigorous agitation and turbulence by a controlled upward flow of a gas or vapour through the bed. Fluidised bed operations are used both in situations where chemical interaction or reaction between a fluidisable solid material and a gas or vapour is required and also in situations where physical interaction, such as heat exchange, is desired, the solid material serving as a heat source, a heat sink, or heat-transfer medium, as the case may be.

It is commonly desired in fluidised bed operations to be able to effect indirect heat-exchange between the fluidised solid material of the bed and a heat transfer fluid passed through conduits extending into the fluidisation zone. This is especially relevant to fluidised bed operations wherein there is high rate of heat evolution (or possibly absorption) as a consequence of chemical interaction between the solid and the gas/vapour phase and/or where the dimensions of the fluidised bed are such that achievable rates of peripheral heat transfer through confining walls are inadequate, or where the nature of the chemical interaction is such that it is adversely highly sensitive to temperature changes within the bed.

The Applicants have not found that the prior proposals of which they are aware for arrangements of heat-transfer fluid-carrying conduits within a fluidised bed are entirely satisfactory, especially for situations where high rates of heat withdrawal from the fluidised bed are required. Such prior arrangements give rise either to inadequate heat withdrawal or to undue conjestion within the fluidisation zone and so to interference with upward gas/vapour flow and proper bed fluidisation.

The present invention provides a method of effecting indirect heat transfer between a fluidised bed of particulate solid material within a fluidisation vessel and conduit-borne heat-transfer fluid and also provides a fluidised bed apparatus or reactor equipped with a particular internal arrangement of heat-transfer conduits suitable for use in the method.

According to the present invention indirect heat-transfer between a fluidised bed of particulate solid material and conduit-borne heat-transfer fluid is effected by passing the heat-exchange fluid through an arrangement of conduits which comprises:
  a. a bundle of parallel upstanding "hair pin tubes" which are in contact with the fluidised bed over a substantial portion, preferably at least the greater portion, of their lengths and are distributed over a major part of, and preferably substantially the whole of, the cross-sectional area of the fluidised bed.
  b. a first underlying generally horizontally extending array of spaced headers for supplying heat-exchange fluid to inlet ends of the tubes of the tube bundle; and
  c. a second underlying generally horizontally extending array of spaced headers for receiving heat-exchange fluid from outlet ends of the tubes of the tube bundle, the supply headers individually serving, together with partner discharge headers, discrete groups of tubes, which groups jointly constitute the tube bundle; any given supply header (or discharge header) may be in communication through U-tubes with either one or two, as desired, discharge headers (or supply headers as the case may be).

The term "hairpin tubes" denotes elongate U-tubes of which parallel arms are close together, though ordinarily with some separation therebetween, and of which, in consequence, the "lap" is of insubstantial horizontal extent. Such tubes, of which many can be present, provide substantially uniform impedance to gas/vapour flow through the bed over their immersed lengths and are, indeed, collectively capable of serving to encourage desirable so-called "plug flow" within the fluidised bed. The "laps" of the hairpin tubes may also be immersed in the fluidised bed if desired. With this arrangement of conduits efficient heat-transfer may be arranged since very considerable effective lengths of heat-exchange conduit may be accommodated without prejudicing effective bed fluidisation.

The supply headers and discharge headers are preferably parallel tubes and preferably they lie substantially in the same general plane. In the arrays of headers considered jointly, a normal arrangement will be one in which supply headers alternate with discharge headers across the width of the bed.

The supply headers are advantageously supplied from a common main supply conduit carrying heat transfer fluid under pressure and they may, if desired, be branch loops (which preferably provide parallel flow lines) of the main supply conduit that both receive and discharge branch flows of heat-transfer fluid into the main stream of the main supply conduit, the hairpin tubes accordingly then jointly receiving part only of the total flow along the supply headers. Similarly the discharge headers may deliver heat transfer fluid discharged from the hairpin tubes into a common main discharge conduit and the discharge headers may, if desired, be branch loops (again preferably providing parallel flow lines) of a main discharge conduit carrying independently supplied heat-transfer fluid at a pressure (having regard to the pressure at which the heat-transfer fluid is supplied to the hairpin tubes and the impedence of the hairpin tubes) which permits a satisfactory flow of heat-transfer fluid through the hairpin tubes. The main supply and discharge conduits are conveniently arcuate or ring circuits set against the side walls of the fluidisation vessel and they advantageously each consist of a pair of similar sections extending in opposite directions from a common supply (or discharge) point.

The present invention includes a fluidisation vessel equipped with an arrangement of heat-exchange conduits comprising supply and discharge headers and connecting hairpin tubes substantially as aforedescribed.

One form of fluidisation vessel in accordance with the present invention and suitable for use in the method of the present invention will now be described by way of Example in greater detail with reference to the accompanying drawings in which FIG. 1 shows diagramatically in side view on an axial plane the general arrangement of the tube bundle and the supply and discharge headers of the fluidisation vessel, and FIG. 2 shows diagramatically the same arrangement as seen in plan view from a level above the tube bundle. For clarity of illustration, a representative few only of the U-tubes of the tube bundle are shown.

Referring to the drawings, the container shell of the fluidisation vessel is indicated by the reference numeral 1 (part only being shown). Located within the shell 1 towards its lower end is a horizontal array of parallel transfer-fluid supply headers 2 interdigitating with a similar horizontal array of parallel transfer-fluid discharge headers 3. The supply headers 2 are fed by an arcuate main supply conduit 4 set against the wall of the shell 1 and the discharge headers 3 deliver fluid into an arcuate main discharge conduit 5 set against the wall of the shell 1 opposite the main supply conduit 4. An inlet 6 penetrating the shell 1 provides access to the main supply conduit 4 and an outlet 7 penetrating the shell 1 opposite the inlet 6 allows for withdrawal of heat-transfer fluid from the main discharge conduit 5. Accordingly, the main supply conduit 4 and the main discharge conduit 5 each consist of a pair of similar sections (4a, 4b and 5a, 5b respectively) extending in opposite directions from inlet 6 or outlet 7. The sections 4a, 4b, 5a, and 5b of the supply and discharge conduits 4 and 5 have step-wise reductions in their cross-sections along their lengths and, in the arrangement illustrated, merge at their ends into terminal supply and discharge headers 2a, 2b, 3a and 3b respectively.

Bridging adjacent pairs of supply and discharge headers 2 and 3 are many vertically extending hairpin U-tubes 8 through which heat-transfer fluid flows from the supply headers 2 to the discharge headers 3. As can be seen from FIG. 2, each supply header 2 (except the outer extreme header 2a) is in communication with both neighbour discharge headers 3 through groups of U-tubes 8 and each discharge header 3 (except the outer extreme header 3b) is similarly in communication with both neighbour supply headers 2 through groups of U-tubes 8. The U-tubes 8 are distributed regularly over substantially the entire cross-sectional area of the contained space within the shell 1 and provide for efficient heat withdrawal over a substantial volume of that contained space. Furthermore, though many in number, the U-tubes 8 do not prevent efficient bed fluidisation but rather tend to encourage a desired pattern of upward gas or vapour flow through the bed.

I claim:

1. A method of effecting indirect heat transfer between a fluidised bed of particulate solid material within a fluidisation vessel and conduit-borne heat-transfer fluid wherein the heat transfer is effected by passing the heat-exchange fluid through an arrangement of conduits which comprises:
  a. a bundle of parallel upstanding "hairpin tubes" of inverted U-shaped which are in contact with the fluidised bed over a substantial portion, of their lengths and are distributed over substantially the whole of, the cross-sectional area of the fluidised bed,
  b. a first underlying generally horizontally extending array of spaced headers for supplying heat-exchange fluid to inlet ends of the tubes of the tube bundle; and
  c. a second underlying generally horizontally extending array of spaced headers for receiving heat-exchange fluid from outlet ends of the tubes of the tube bundle, the supply headers individually serving, together with partner discharge headers, discrete groups of tubes, which groups jointly constitute the tube bundle.

2. A method as in claim 1 wherein the supply headers and discharge headers are parallel tubes extending the interior of the fluidization vessel and lying in substantially the same general plane, and wherein the supply headers and the discharge headers uniformly interdigitate and respectively communicate with arcuate main supply and main discharge conduits which are set against the inner wall of the vessel.

3. A method as in claim 1 wherein each of said supply headers communicates with the discharge headers located on either side thereof, by means of said discrete groups of tubes, a terminal supply header communicating with a discharge header, and a terminal discharge header communicating with a supply header.

* * * * *